(12) United States Patent
Cho et al.

(10) Patent No.: US 10,439,294 B2
(45) Date of Patent: Oct. 8, 2019

(54) COMPOSITE STRUCTURE FOR CONTROLLING ABSORPTIVITY OF RADAR AND EMISSIVITY OF INFRARED REGIONS

(71) Applicant: INDUSTRY-ACADEMIC COOPERATION FOUNDATION YONSEI UNIVERSITY, Seoul (KR)

(72) Inventors: Hyung Hee Cho, Seoul (KR); Taehwan Kim, Incheon (KR); Hwanseong Lee, Hongseong-gun (KR); Ji-Yeul Bae, Busan (KR); Namkyu Lee, Bucheon-si (KR); Taeil Kim, Seoul (KR)

(73) Assignee: INDUSTRY-ACADEMIC COOPERATION FOUNDATION YONSEI UNIVERSITY, Seoul (KR)

( * ) Notice: Subject to any disclaimer, the term of this patent is extended or adjusted under 35 U.S.C. 154(b) by 307 days.

(21) Appl. No.: 15/452,820

(22) Filed: Mar. 8, 2017

(65) Prior Publication Data
US 2018/0069319 A1    Mar. 8, 2018

(30) Foreign Application Priority Data

Sep. 2, 2016 (KR) .......................... 10-2016-0113155

(51) Int. Cl.
*H01Q 17/00* (2006.01)
*B32B 15/04* (2006.01)

(52) U.S. Cl.
CPC ............ *H01Q 17/007* (2013.01); *B32B 15/04* (2013.01); *B32B 2307/202* (2013.01)

(58) Field of Classification Search
CPC ........ H01Q 17/00; H01Q 17/007; H01Q 17/08
See application file for complete search history.

(56) References Cited

U.S. PATENT DOCUMENTS 5,208,603 A * 5/1993 Yee ..................... H01Q 1/286
343/872
9,306,290 B1 * 4/2016 Grop ..................... H01Q 17/00
(Continued)

FOREIGN PATENT DOCUMENTS

CN 104990459 A 10/2015
JP 06-323789 A 11/1994
(Continued)

OTHER PUBLICATIONS

KIPO Notice of Allowance for Korean Application No. 10-2016-0113155 dated Nov. 26, 2018 which corresponds to the above-referenced U.S. application.
(Continued)

*Primary Examiner* — Peter M Bythrow
*Assistant Examiner* — Michael W Justice
(74) *Attorney, Agent, or Firm* — LRK PATENT LAW FIRM

(57) ABSTRACT

A technique of adjusting absorptivity of radar waves and emissivity of infrared waves by controlling the waves of the radar and infrared regions using a structure formed of a meta-material. A composite structure for controlling absorptivity and emissivity includes: a first anti-detection unit; and a second anti-detection unit stacked on the first anti-detection unit, wherein the first anti-detection unit is an absorber for absorbing electromagnetic waves of a first range input from an outside of the first anti-detection unit, and the second anti-detection unit is a selective emitter for selectively blocking emission of electromagnetic waves of a second range and selectively allowing emission of electromagnetic waves of a third range among electromagnetic waves that can be emitted to an outside of the second anti-detection unit.

8 Claims, 10 Drawing Sheets

(56) References Cited

U.S. PATENT DOCUMENTS

2014/0125506 A1* 5/2014 Sjolund ................ H01Q 17/00
  342/3
2016/0165767 A1* 6/2016 Tsai .................... H01Q 17/002
  252/62
2017/0338567 A1* 11/2017 Puscasu ............... H01Q 15/006

FOREIGN PATENT DOCUMENTS

| JP | 4157057 B2 | 9/2008 |
| KR | 10-2009-0131571 A | 12/2009 |
| KR | 10-2010-0072383 A | 7/2010 |
| KR | 10-2013-0076011 A | 7/2013 |
| KR | 1020150139050 A | 12/2015 |

OTHER PUBLICATIONS

KIPO Office Action for Korean Application No. 10-2016-0113155 dated Feb. 23, 2018 which corresponds to the above-referenced U.S. application.

Taehwan Kim et al. "Infrared selective emitter for enhancement of aircraft survivability in air-to-air combat", The Korea Institute of Military Science and Technology, 2016.

\* cited by examiner

COMPOSITE STRUCTURE FOR CONTROLLING ABSORPTIVITY OF RADAR AND EMISSIVITY OF INFRARED REGIONS

CROSS REFERENCE TO RELATED APPLICATION

The present application claims priority to Korean Patent Application No. 10-2016-0113155, filed in the Korean Intellectual Property Office on Sep. 2, 2016, the entire content of which is incorporated herein by reference.

BACKGROUND OF THE INVENTION

1. Field of the Invention

The present invention relates to a technique of preventing detection by waves of radar and infrared regions, and particularly, to a technique of adjusting absorptivity of radar waves and emissivity of infrared waves by controlling the waves of the radar and infrared regions using a structure formed of a meta-material.

2. Description of Related Art

A radar is a wireless surveillance system for detecting a target object using reflected and returned radio waves after sending out artificial radio waves from a device generating electromagnetic waves. Infrared (IR) is a waveform appearing around an object in a certain form unless temperature of the object is the absolute zero degree (K), which is detected using equipment such as an Infrared Search and Track (IRST) system or the like and applied to various military equipment, missile techniques and the like, in addition to aircrafts, together with a technique of detecting the radar.

An infrared anti-detection technique and a radar anti-detection technique are techniques for enhancing camouflage of aircrafts, vessels and various military equipment, which enhance survivability of allies by minimizing observability of the allies in a situation confronted with enemies. Specifically, an infrared detector detects a target using a difference between thermal energy signals of a detection target and its background, and generally, a weapon system including aircrafts, vessels, tanks and the like has a high temperature compared with the surrounding atmosphere and ground surface due to heat generation of high-temperature engines. Particularly, an aircraft flying at supersonic speed has a temperature higher than the temperature of the surrounding atmosphere since the surface temperature increases due to friction with the air. In such an environment, the lower the temperature and the emissivity of a detection target, the lower the probability of detection since magnitude of the infrared energy emitted from the detection target is reduced.

In addition, as described above, a radar detector uses a principle of sending out a radar signal and receiving a signal reflected and returned from a detection target to detect a target object. Accordingly, although sending out itself of radio waves from an enemy radar cannot be prevented unless the radar detector is destroyed, it is possible to prevent the radar detector from receiving the returning reflected waves. Specifically, the more the returning radar waves are reduced by absorbing much of the radar waves input into an object, the lower the probability of detection by the radar detector. A measure of determining how much radio waves an object reflects is expressed as a numeric value referred to as a Radar Cross Section (RCS). The smaller the RCS value, the smaller the object displayed on the radar of the enemy, and general aircrafts have a value larger than 1.0 $m^2$, whereas aircrafts having a high anti-detection performance by reducing the RCS value may have a value of 0.01 to 0.0001 $m^2$.

As is confirmed from the above description, the method of avoiding detection by an infrared detector is different from the method of avoiding detection by a radar detector.

As a method well-known for radar anti-detection, there is a method of drastically reducing radio waves returning to an enemy radar by applying a radar absorbing material (RAM) on the surface of an aircraft. However, a painting material such as the RAM has many disadvantages from the aspect of maintenance/management/feasibility, such as repeatedly re-applying the painting material each time the aircraft is operated to maintain the anti-detection performance since the painting material is eroded.

In order to prevent detection by an infrared detector, the heat naturally emitted from the surface of an object should be reduced as described above, and to this end, techniques of forming an absorption coating layer on the surface of a target object have been disclosed.

Under the recognition that detection by a radar detector and detection by an infrared detector should be prevented together in order to effectively cope with threats of enemies, studies on techniques of combining a radar anti-detection technique and an infrared anti-detection technique are actively progressed recently.

For example, there are Korean Patent Application Publication No. 10-2013-0076011 A and Chinese Patent Application Publication No. 104990459 A.

The prior art as described above has tried to accomplish the object of anti-detection by preparing a material compatible to both radar waves and infrared waves through a method of fiber reinforcement or chemical modification. However, as is described above in the method of applying a painting material such as the RAM, such a method is not free from a phenomenon of easily eroding the painting material by the friction with the air when an aircraft flies at a high-speed. In addition, since techniques of the prior art are patents related to compositions, there is a problem in that it is difficult to verify durability of the painting material.

SUMMARY OF THE INVENTION

The present invention relates to a technique for lowering probability of detection by a radar detector and an infrared detector, and there is provided a technique approached from the structural aspect to improve the anti-detection function.

As a means thereof, in the present invention, absorptivity of a radar region and emissivity of an infrared region will be controlled together using a meta-material.

An object of the present invention is to improve survivability of ally weapon systems against threats of enemies using radar and infrared detectors.

According to an embodiment of the present invention, there is provided a composite structure for controlling absorptivity and emissivity, the structure including: a first anti-detection unit; and a second anti-detection unit stacked on the first anti-detection unit, wherein the first anti-detection unit is an absorber for absorbing electromagnetic waves of a first range input from an outside of the first anti-detection unit, and the second anti-detection unit is a selective emitter for selectively blocking emission of electromagnetic waves of a second range and selectively allowing emission of electromagnetic waves of a third range among electromagnetic waves that can be emitted to the outside of the second anti-detection unit.

Here, the first anti-detection unit may be an anti-detection unit for absorbing electromagnetic waves of a radar region, and the second anti-detection unit may be an anti-detection unit for selectively emitting electromagnetic waves of an infrared region.

In addition, the electromagnetic waves of the third range may be waves having a continuous wavelength corresponding to part of a wavelength of a several to several tens of micrometer range, and the electromagnetic waves of the second range may be electromagnetic waves having a wavelength corresponding to an area other than the electromagnetic waves of the third range.

Furthermore, the electromagnetic waves of the third range may be waves having a wavelength larger than 5 μm and smaller than 8 μm, and the electromagnetic waves of the second range may be waves having a wavelength larger than or equal to 3 μm and smaller than or equal to 5 μm or larger than or equal to 8 μm and smaller than or equal to 12 μm.

According to an embodiment, the first anti-detection unit may include a first bottom unit, a first dielectric, an electromagnetic wave shield layer, a second dielectric and a first metal layer stacked in order.

Here, the first metal layer may be configured of a plurality of unit metal blocks of the same shape arranged on the second dielectric.

At this point, the plurality of unit metal blocks may be spaced apart from each other to form a certain pattern.

At this point, a configuration of the first metal layer may be the same as a configuration of a bottom unit of the second anti-detection unit, and the bottom unit of the second anti-detection unit may be replaced with the first metal layer.

According to an embodiment, the second anti-detection unit may include a second bottom unit, a third dielectric and a second metal layer stacked in order.

Here, the second metal layer may be configured of a plurality of unit metal blocks of the same shape arranged on the third dielectric.

At this point, the plurality of unit metal blocks may be spaced apart from each other to form a certain pattern.

At this point, a wavelength of the electromagnetic waves of the second range may vary according to change of diameter of the unit metal blocks configuring the second metal layer, and an emission amount of the electromagnetic waves of the second range may vary according to change of thickness of the third dielectric.

DETAILED DESCRIPTION OF THE PREFERRED EMBODIMENT

The preferred embodiments of the invention will be hereafter described in detail with reference to the accompanying drawings.

It will be understood that the expressions and the predicates used in this application in relation to terms for directions of a device or an element, for example, the terms such as "up", "down", "top", "bottom" and the like, are used only to simplify the description of the present invention and do not express or mean that a related device or element should necessarily have a specific direction.

In the description below, the x-axis may mean the length direction of a composite structure for controlling absorptivity and emissivity, the y-axis may mean the width direction of the composite structure for controlling absorptivity and emissivity, and the z-axis may mean the height direction of the composite structure for controlling absorptivity and emissivity.

In addition, the expressions such as "first", "second", "third" and the like are expressions only for distinguishing a plurality of elements and do not restrict the sequence or other features of the elements.

The singular forms are intended to include the plural forms as well, unless the context clearly indicates otherwise. The terms "include", "have" or the like used in this specification specify the presence of stated features, numerals, steps, operations, components, parts or a combination thereof, and it may be interpreted that one or more other features, numerals, steps, operations, components, parts or a combination thereof may be added.

In this specification, the term "block" means controlling energy not to proceed toward the direction of progress and may include the concepts of refraction and reflection of the energy. In addition, it should be noted that "the same time" is a concept of time flow and is not necessarily interpreted as a concept opposed to a "different time". Rather, it should be understood to mean that absorptivity of a radar region and emissivity of an infrared region can be controlled "together".

Hereinafter, a composite structure 100 for controlling absorptivity and emissivity of radar and infrared regions of the present invention will be described in detail with reference to FIGS. 1 and 2.

Figure 1:
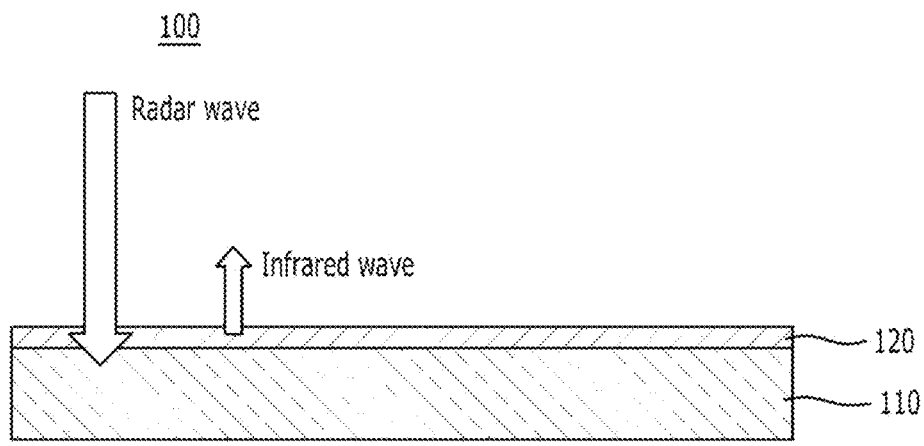
FIG. 1 is a mimetic view showing a composite structure for controlling absorptivity and emissivity of radar and infrared regions according to the present invention.
Figure 2:
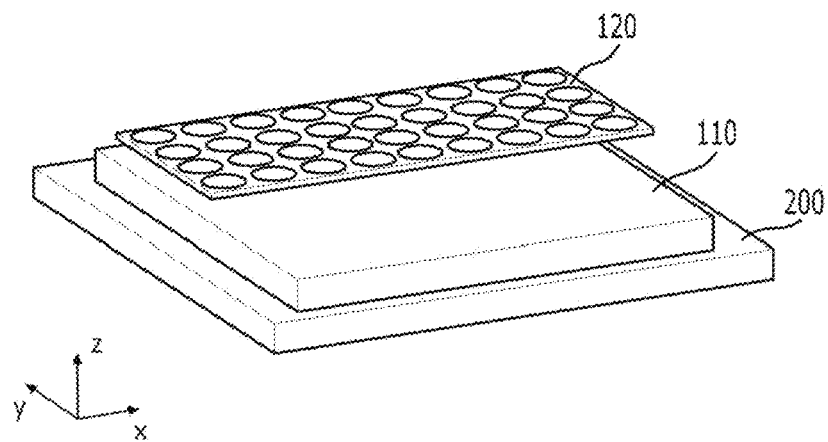
FIG. 2 is a perspective view showing the composite structure of FIG. 1.

FIG. 1 is a mimetic view showing a composite structure for controlling absorptivity and emissivity of radar and infrared regions according to the present invention. FIG. 2 is a perspective view showing the composite structure of FIG. 1.

The composite structure 100 for controlling absorptivity and emissivity of radar and infrared regions may include a first anti-detection unit 110 and a second anti-detection unit 120 stacked on the first anti-detection unit 110. Here, the first anti-detection unit 110 and the second anti-detection unit 120 may be an element corresponding to a skin of a product or a structure. For example, they may be an element corresponding to the skin of a fuselage or a wing of an aircraft.

The composite structure for anti-detection of the present invention may be generally called as a term "stealth" and applied to various military equipment such as aircrafts, vessels, tanks and the like, missiles and special purpose equipment according to circumstances. In addition, it can be used as a means for securing safety of a human body from various radar or infrared detectors. For example, it can be used as a material installed on the outer walls of a building to protect residents in an area in which a Terminal High Altitude Area Defense (THAAD) missile defense system, which becomes an issue in domestic and foreign media recently, is installed. In addition, it can be actively utilized for any product or structure if the purpose is to block both radar and infrared waves.

Here, the first anti-detection unit 110 is an absorber for absorbing electromagnetic waves of a first range input from the outside of the first anti-detection unit 110, and the second anti-detection unit 120 may be a selective emitter for blocking emission of electromagnetic waves of a second range and allowing emission of electromagnetic waves of a third range among the electromagnetic waves that can be emitted to the outside of the second anti-detection unit.

In the description below, the first anti-detection unit 110 may be simply referred to as an 'absorber', and the second anti-detection unit 120 may be simply referred to as a 'selective emitter'.

Particularly, according to an embodiment of the present invention, the first anti-detection unit 110 is an anti-detection unit for absorbing electromagnetic waves of a radar region, and the second anti-detection unit 120 is an anti-detection unit for selectively emitting electromagnetic waves of an infrared region.

Referring to the figures, starting from the bottom (in the z-axis direction), the first layer (a first layer) corresponds to the first anti-detection unit 110 as a layer for absorbing electromagnetic waves of the radar region, and the second layer (a second layer) arranged on the first anti-detection unit corresponds to the second anti-detection unit 120 as a layer for transmitting electromagnetic waves of the radar region while controlling infrared waves of each wavelength emitted to the outside.

As is described above in the background of the invention, a radar stealth technique is a principle in which the probability of detection by a radar detector is lowered as the returning radar waves are reduced by absorbing much of incident radar waves, and in the present invention, the first anti-detection unit 110 absorbs the electromagnetic waves of the first range arriving at the first anti-detection unit 110.

In addition, the infrared stealth technique of the present invention selectively controls emissivity of infrared energy for the electromagnetic waves of the second range, which is a region used by an infrared detector, and the electromagnetic waves of the third range, which is a region that is not used by the infrared detector, lower temperature of the surface by emitting infrared energy. For example, the probability of detection by an infrared detector may be lowered by making infrared energy released from a target object such as an aircraft, a vessel or the like to be the same as the infrared energy released from an environment surrounding the target object. Generally, the lower the temperature and the emissivity of a detection target are, the lower the probability of detection becomes since magnitude of the infrared energy emitted from the detection target is small.

Meanwhile, in this specification, the "range" of the first range, the second range and the third range means a partitioned area of the electromagnetic waves mentioned in the Radio Regulations (RR) enacted by World Radiocommunication Conference (WRC).

Specifically, in the case of the first range, the range may mean electromagnetic waves corresponding to an extremely high frequency (EHF, a wavelength of about 1 mm to 1 cm), a super high frequency (SHF, a wavelength of about 1 to 10 cm) and an ultra-high frequency (UHF, a wavelength of about 10 cm to 1 m) mainly used for military purposes. If this is converted into a frequency unit, it corresponds to a wave having a frequency of several hundreds of MHz to several tens of GHz. Specifically, L-Band, S-Band, C-Band, X-Band, KU Band, K-Band and Ka-Band may correspond to the electromagnetic waves of the first range.

In addition, in the case of the second and third ranges, the range may mean electromagnetic waves corresponding to infrared (thermal radiation) waves. The infrared waves generally have a wavelength of 800 nm to 0.1 mm and a frequency of a THz unit.

Particularly, in the present invention, the electromagnetic waves of the third range are waves having a continuous wavelength corresponding to part of a wavelength of a several to several tens of micrometer range, and the electromagnetic waves of the second range are electromagnetic waves having a wavelength of a micrometer range corresponding to an area other than the electromagnetic waves of the third range.

An embodiment expressing the first range, the second range and the third range of the present invention as a specific numeric value is as shown below.

Preferably, radar waves of the first range may correspond to electromagnetic waves having a frequency of X-band (8 to 12 GHz). The electromagnetic waves of the infrared region of the second range are preferably electromagnetic waves having a wavelength larger than or equal to 3 µm and smaller than or equal to 5 µm or larger than or equal to 8 µm and smaller than or equal to 12 µm, which is a region in which a general infrared detector detects an object. In addition, the electromagnetic waves of the third range are electromagnetic wave having a wavelength of a range that is not overlapped with the second range and may have a wavelength larger than 5 µm and smaller than 8 µm. Although the electromagnetic waves of the second range and the third range basically mean electromagnetic waves having wavelength ranges different from each other, they are interdependent from the aspect that the third range changes according to change of the second range.

The second anti-detection unit 120 according to an embodiment of the present invention lowers the probability of detection by setting the second range to a wavelength range of 3 to 5 µm or 8 to 12 µm and selectively decreasing or increasing emissivity of the second range, for example, making the infrared energy of the environment around an aircraft to be the same as the infrared energy of the surface of an anti-detection composite structure (stealth).

For reference, the infrared energy accumulated on the surface unit of the anti-detection composite structure (stealth) may be released by emitting the infrared electromagnetic waves corresponding to the third range. Since the infrared range generally having a wavelength larger than 5 µm and smaller than 8 µm is known as a region in which scattering and absorption easily occur in the air, it is preferable to set the numeric value of the third range to a wavelength range larger than 5 μm and smaller than 8 μm.

In order to implement such a function described above, the first anti-detection unit 110 and the second anti-detection unit 120 of the present invention are formed of a meta-material.

Generally, since the characteristics of a meta-material such as permittivity, permeability, a refractive index, scattering parameters and the like can be arbitrarily controlled unlike naturally existing atoms or molecules, the meta-material is diversely used as a new material or structure.

Particularly, the meta-material is used as a very important element in relation to a technique of controlling energy of a wave form. It is since that a wave exists (or is defined) in the form of various wavelengths (frequencies) in a medium.

Figure 4:
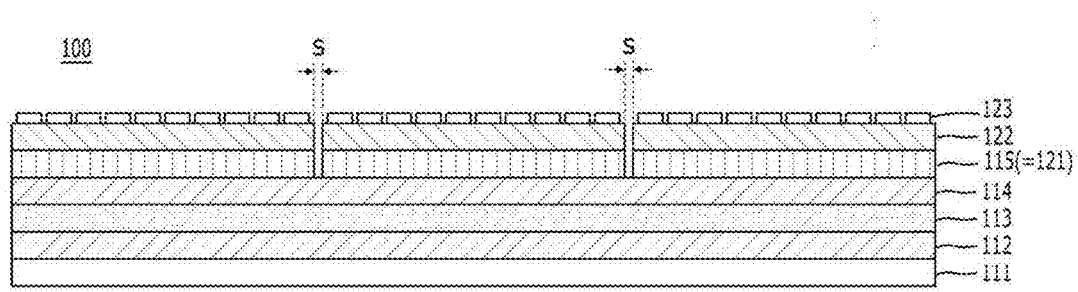
FIG. 4 is a cross-sectional view showing a plurality of metal blocks configuring a first metal layer arranged in the composite structure shown in FIG. 3.
Figure 5:
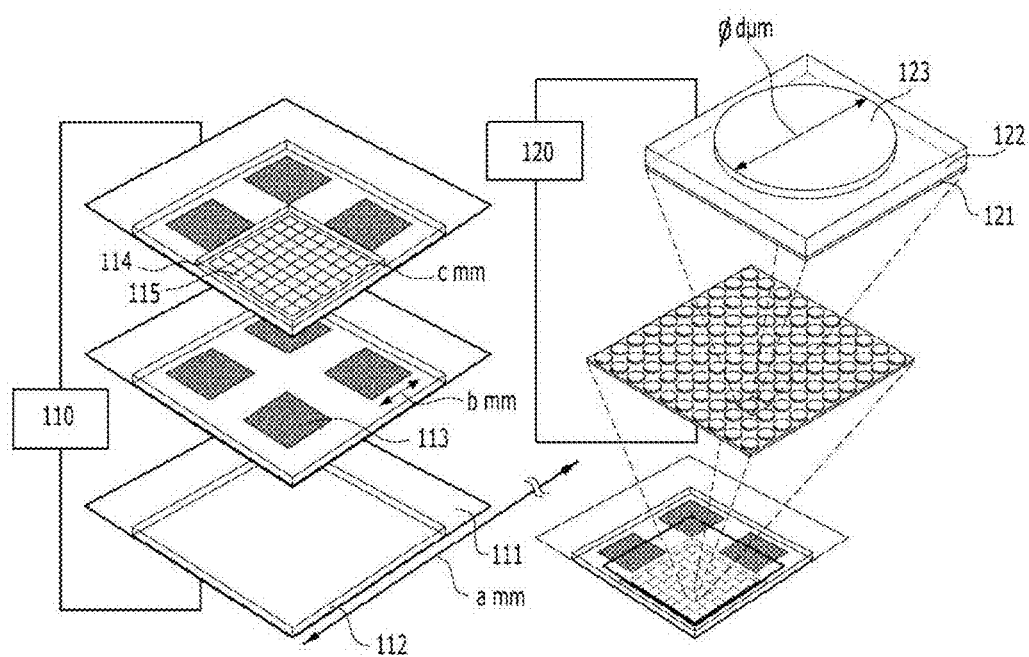
FIG. 5 is a perspective view showing a composite structure for controlling absorptivity and emissivity of radar and infrared regions according to an embodiment of the present invention.

Next, a specific embodiment of a composite structure for controlling absorptivity and emissivity of radar and infrared regions using the meta-material of the present invention will be described with reference to FIGS. 3 to 5.

Figure 3:
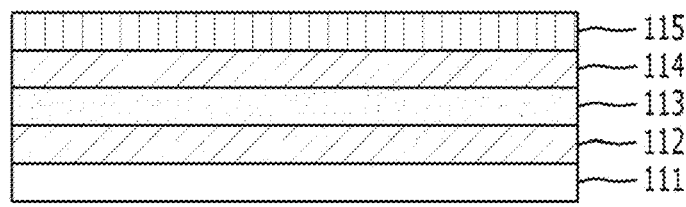
FIG. 3 is a cross-sectional view showing a composite structure for controlling absorptivity and emissivity of radar and infrared regions according to an embodiment of the present invention.
Figure 3:
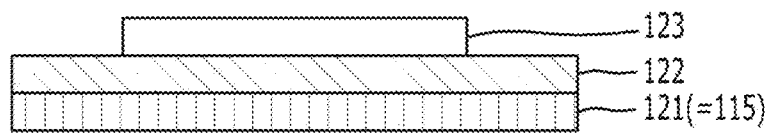
Figure 3:
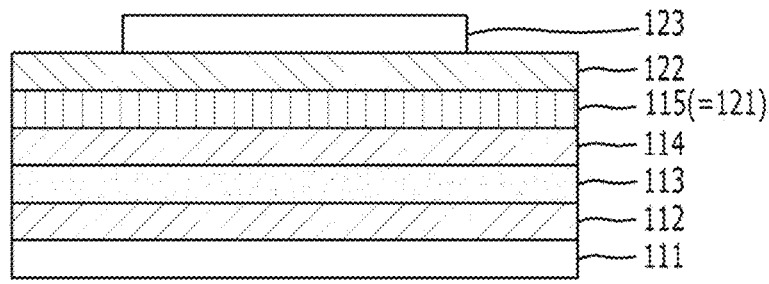

FIG. 3 is a cross-sectional view showing a composite structure for controlling absorptivity and emissivity of radar and infrared regions according to an embodiment of the present invention. FIG. 4 is a cross-sectional view showing a plurality of metal blocks configuring a first metal layer in the composite structure shown in FIG. 3. FIG. 5 is a perspective view showing a composite structure for controlling absorptivity and emissivity of radar and infrared regions according to an embodiment of the present invention.

In the composite structure of the present invention, the first anti-detection unit 110 is formed to have a size unit larger than the size unit of the second anti-detection unit 120 in the x and y directions. For example, the first anti-detection unit 110 may be formed to have a size unit of millimeters (mm) in the x and y directions, and the second anti-detection unit 120 may be formed to have a size unit of micrometers (μm) in the x and y directions. Accordingly, the second anti-detection unit 120 may be stacked on the first anti-detection unit 110 having a relatively large size unit.

An important feature of the present invention is that the first anti-detection unit 110 may include a first bottom unit 111, a first dielectric 112, an electromagnetic wave shield layer 113, a second dielectric 114 and a first metal layer 115 arranged to be stacked in order as shown in FIG. 3.

In addition, another important feature of the present invention is that the second anti-detection unit 120 may include a second bottom unit 121, a third dielectric 122 and a second metal layer 123 arranged to be stacked in order.

Specifically, the first bottom unit 111 may form an inner side surface of the body in a target object such as an aircraft, a vessel or the like. In addition, the first bottom unit 111 may be formed of a material practically the same as that of the first metal layer 115. For example, it can be formed of copper, aluminum, gold or the like. The first dielectric 112 may be arranged on the first bottom unit 111, and the electromagnetic wave shield layer 113 may be arranged on the first dielectric 112. Furthermore, another second dielectric 114 may be arranged on the electromagnetic wave shield layer 113, and the first metal layer 115 may be arranged on the second dielectric 114.

Transmittance of electromagnetic waves through the first metal layer 115 is determined by the pattern of the first metal layer 115. If the first metal layer 115 exists in the form of a metal plate, the radar region electromagnetic waves cannot pass through the metal plate. However, if the metal plate has a specific pattern like the first metal layer 115, electromagnetic waves of a specific frequency may pass through the metal plate. The first metal layer 115 performs a function of passing electromagnetic waves of the radar region desired to be absorbed. The first metal layer 115 herein may diversely adopt copper, aluminum, gold or the like.

The electromagnetic waves passing through the first metal layer 115 pass through the second dielectric 114, and at this point, since movement of free electrons is relatively slow in a dielectric, the electromagnetic waves passing through the first metal layer 115 begin to be absorbed. The wavelength of the absorbed electromagnetic waves may be specified, and this may be determined according to physical property values such as a loss tangent or the like of the second dielectric 114. The second dielectric of the present invention may include epoxy resin such as FR4.

The electromagnetic waves passing through the second dielectric 114 meet the electromagnetic wave shield layer 113 and are absorbed therein. The electromagnetic wave shield layer 113 preferably uses a material having a property between a metal and a dielectric. For example, the electromagnetic wave shield layer 113 may use carbon mainly used as a general radar stealth material generating an electromagnetic wave loss. Since the principle is that electromagnetic energy stays in this part, detection by waves of a radar can be prevented.

The electromagnetic waves passing through the electromagnetic wave shield layer 113 arrive at the first dielectric 112 while the energy is considerably reduced compared with the electromagnetic waves initially input into the first metal layer 115, and a considerable amount of electromagnetic wave energy is absorbed here, and the electromagnetic waves finally arrive at the first bottom unit 111. According to one embodiment, the first dielectric 112 and the second dielectric 114 may be practically formed of the same material. In addition, thickness of the dielectrics 112 and 114 and the metals 111 and 115 may be set to be the same or freely set to have a dimension different from those of the others.

As is understood from the above description, one of the characteristics of the present invention is that the first anti-detection unit 110 includes the first bottom unit 111 and the first dielectric 112 positioned under the electromagnetic wave shield layer 113 generating an electromagnetic wave loss and the second dielectric 114 and the first metal layer 115 positioned on the electromagnetic wave shield layer 113.

Figure 8:
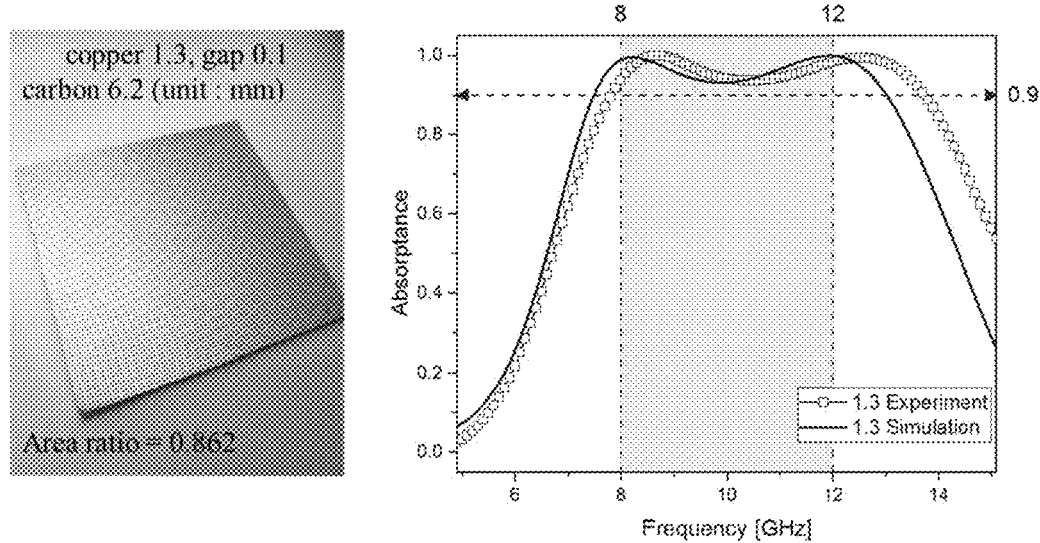
FIG. 8 is a view showing a radar region absorber and a simulation result according to measuring performance of the absorber.

If the first dielectric 112 and the second dielectric 114 are consecutively arranged between the first metal layer 115 and the first bottom unit 111, the overall radar absorber is configured in order of metal->dielectric->metal, and in this case, the range of the absorbed electromagnetic waves of the radar region will be very restrictive. However, since the overall radar absorber is configured in order of metal->dielectric->shield layer->dielectric->metal in the present invention by providing the shield layer 113, which has a property different from those of the dielectrics 112 and 114 and generates an electromagnetic wave loss, between the first dielectric 112 and the second dielectric 114, there is an advantage in that the range of absorbing the electromagnetic wave of the radar region is remarkably expanded. As is described below, referring to the radar absorptance area of FIG. 8, two peak points are shown in the figure, and basically, the peak points are generated around the interface between the metal and the dielectric. Since FIG. 8 is a graph showing a result when the shield layer 113 is provided, the region of absorbing the radar waves is considerably large. However, if the shield layer 113 is not provided, only radar waves of a remarkably small region are absorbed unlike the result shown in FIG. 8. Like this, the electromagnetic wave shield layer 113 of the present invention is a very meaningful component.

Meanwhile, the second anti-detection unit 120 of the present invention includes a second bottom unit 121, a third dielectric 122 and a second metal layer 123, which is the uppermost layer, arranged in order from the bottom. As described above, transmittance of electromagnetic waves is determined by a plasma frequency and a damping constant of the metal and a loss constant of the dielectric, and the infrared waves are also a kind of electromagnetic waves greatly affected by the factors described above when the waves propagate. Particularly, since a resonance phenomenon of electromagnetic waves occurs in the second metal layer 123 at a specific wavelength according to movement of free electrons in the metal, electromagnetic waves pass through part of the wavelength range and do not pass through other parts of the wavelength range.

The inventor of this application of the present invention has found that a frequency for generating a resonance phenomenon can be adjusted by the shape, dimension and material of the second metal layer 123 and the material and thickness of the dielectric and that a wavelength range allowing transmission of electromagnetic waves and a wavelength range disallowing transmission of electromagnetic waves can be adjusted according to the frequency. Detailed experiment data on this will be described below.

As another important technical feature of the present invention, the first metal layer 115 is configured to be the same as the bottom unit 121 of the second anti-detection unit 120, and the bottom unit 121 of the second anti-detection unit 120 may be replaced with the first metal layer 115. According to this, if any one of the first metal layer 115 and the bottom unit 121 having the same function is omitted, the volume and weight of the a target object to which the composite structure is applied can be reduced as the volume of the entire configuration is reduced, and cost of the target object also can be reduced.

In addition, according to an embodiment of the present invention, the first metal layer 115 may be arranged on the second dielectric 114 while slits are formed between a plurality of metal blocks configuring the first metal layer 115 (while the metal blocks are spaced apart from each other by a distance S). Referring to FIG. 4, a view of arranging several composite structures of FIG. 3(c) is shown in the figure. This may be regarded as showing a view of actually applying the first anti-detection unit 110 and the second anti-detection unit 120 to an aircraft or vessel, and here, it can be confirmed that the slits are formed between a plurality of metal blocks configuring the first metal layer 115 so that the metal blocks are spaced apart from each other by a distance S. In addition, it is shown in the figure that the second bottom unit 121 is replaced with the first metal layer 115.

According to an embodiment of the present invention, the first anti-detection unit 110 is in a millimeter unit, and the second anti-detection unit 120 may be formed to have a size of nanometer unit. For example, the first anti-detection unit 110 shown in FIG. 4 is configured to have a thickness of 0.5 to 2 mm. Contrarily, since the unit metal block of the second anti-detection unit 120 is formed to have a thickness of approximately 200 nm in the height direction (z direction) and the third dielectric is formed to have a thickness of approximately 200 nm in the height direction (z direction), the second anti-detection unit 120 may be configured to have a total height of approximately 400 nm. If electromagnetic waves of the radar region (electromagnetic waves having a wavelength of about 3 cm) are input into the composite structure of the present invention, most of the electromagnetic waves are not reflected by the second anti-detection unit 120 and pass through the second anti-detection unit 120 since the second anti-detection unit 120 has a size of one out of several thousand compared with the wavelength of the input electromagnetic waves.

Among the electromagnetic waves passing through the second anti-detection unit 120, only electromagnetic waves of the radar region having a specific wavelength may be absorbed in the radar absorber according to the distance S of the slits formed on the first metal layer 115 or the thickness of the first metal layer 115. For example, if the distance S of the slits or the thickness of the first metal layer 115 is properly set, only the X-band radar waves having a wavelength of about 3 cm (having a frequency of 8 to 12 GHz) are absorbed in the radar absorber, and electromagnetic waves of the other wavelength ranges are not absorbed but reflected by the first anti-detection unit 110.

According to an embodiment of the present invention, the first bottom unit 111 is formed to have a length of 'a' mm (e.g., 70 mm) in the x-axis direction, and the electromagnetic wave shield layer 113 is formed to have a length of 'b' mm (e.g., 6.2 mm). In addition, the first metal layer 115 and the third dielectric 122 are formed to have a length of 'c' mm (e.g., 1.3 mm) and practically the same area. At this point, the unit metal block of the second metal layer 123 is formed to have a diameter of 'd' μm (e.g., 1.5 μm). Due to such a difference in scale, several hundreds and thousands of the second anti-detection unit 120 may be arranged on the first anti-detection unit 110.

The second metal layer 123 is arranged on the third dielectric 122 as described above, and at this point, the second metal layer 123 may be formed by regularly arranging a plurality of unit metal blocks of the same shape. Here, the plurality of unit metal blocks is spaced apart from each other to form a certain pattern.

Here, the unit metal blocks configuring the second metal layer 123 may have any one of shapes including a circle, a triangle, a rectangle, a polygon and a cross pattern on the top surface of the second anti-detection unit 120.

In addition, the wavelength of the electromagnetic waves of the second range varies according to change of the shape and diameter of the unit metal blocks configuring the second metal layer 123, and an emission amount of the electromagnetic waves of the second range varies according to change of thickness of the third dielectric.

To help better understanding, simulations on the composite structure for controlling absorptivity and emissivity of radar and infrared regions and results thereof will be described below.

Figure 6A:
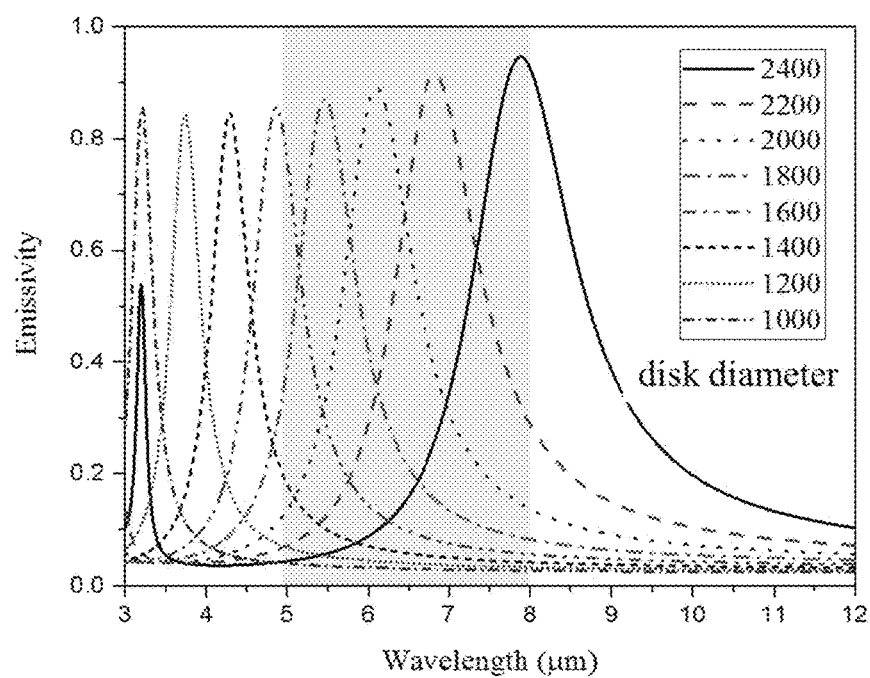
FIGS. 6A to 6D show graphs of simulation results obtained by change of wavelength according to change of diameter of unit metal blocks configuring a second metal layer of the present invention, change of emissivity according to change of thickness of a third dielectric, and change of the height and material of the unit metal block.
Figure 6B:
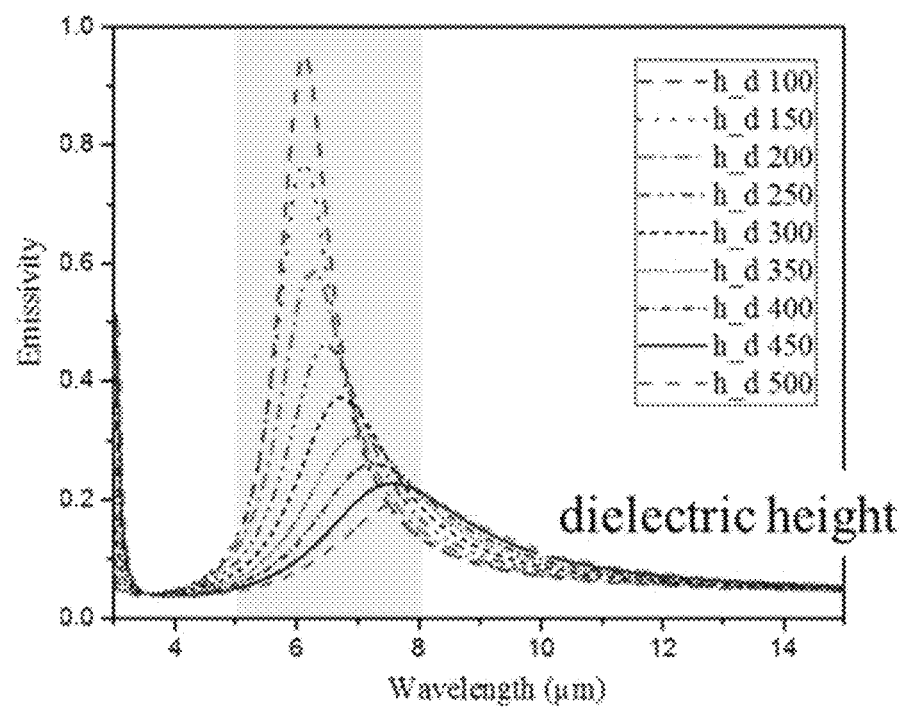
Figure 6C:
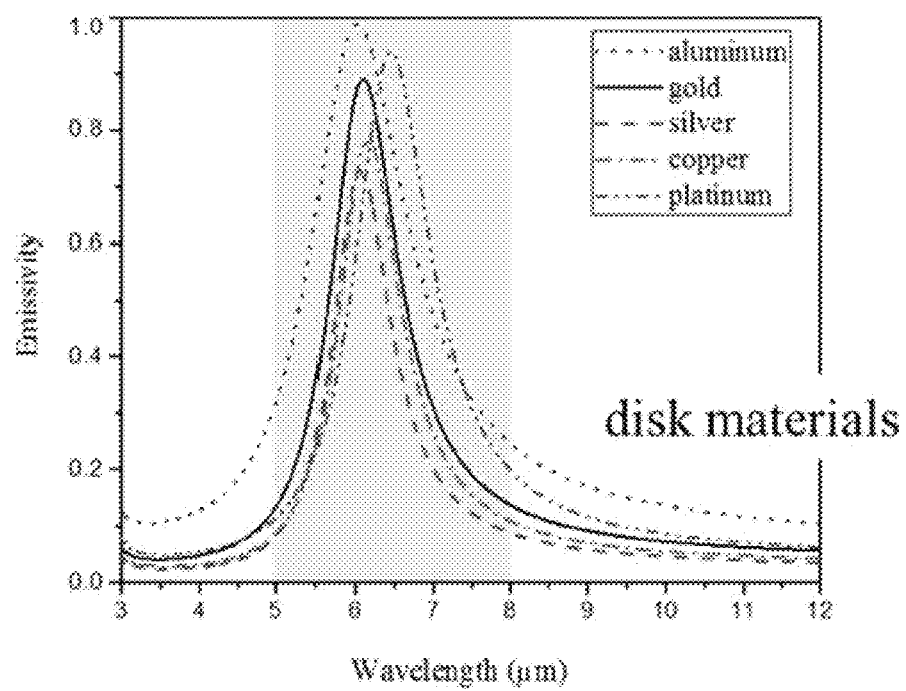
Figure 6D:
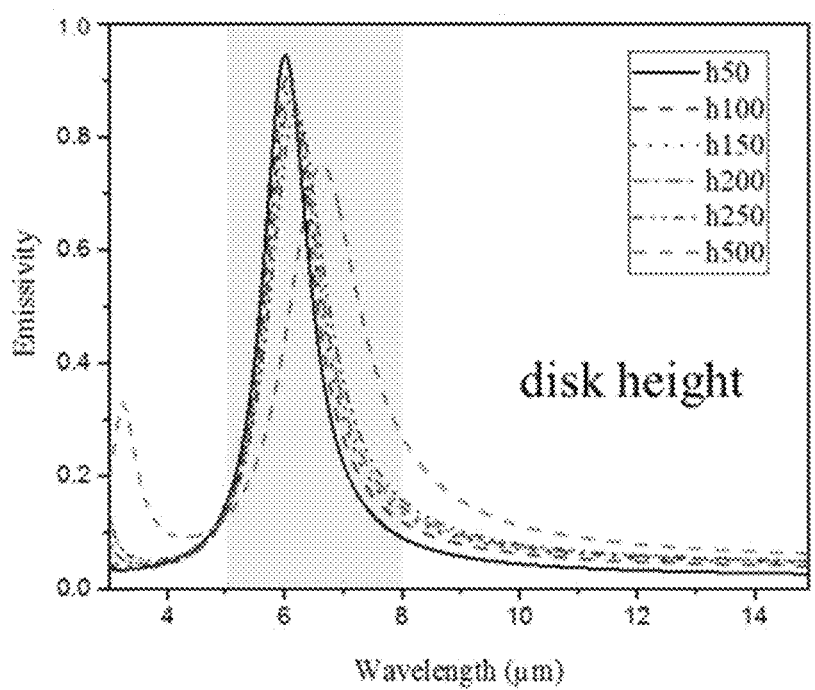

FIGS. 6A to 6D show graphs of simulation results of the present invention. Specifically, FIG. 6A is a view showing change of wavelength according to change of diameter of unit metal blocks configuring the second metal layer of the present invention, FIG. 6B is a view showing change of emissivity according to change of thickness of the third dielectric, FIG. 6C is a view showing change of emissivity according to change of material of the unit metal block, and FIG. 6D is a view showing change of emissivity according to change of height of the unit metal block.

As an embodiment, in FIGS. 6A to 6D, the unit metal block is set as a disk of a small height.

Referring to FIG. 6A, it can be confirmed that emissivity of each infrared wavelength is changed according to the diameter size of the unit metal block. The smaller the diameter of the metal disk is, the higher the emissivity is in a short wavelength since infrared waves resonate with the electromagnetic waves of a short wavelength, and the larger the diameter of the metal disk is, the higher the emissivity is in a long wavelength since the infrared waves resonate with the electromagnetic waves of a long wavelength. A stable performance is shown when the height of the metal disk is 50 to 250 nm.

Referring to FIG. 6B, it is understood that the emissivity can be adjusted at a corresponding wavelength by adjusting thickness of the third dielectric 122. As the thickness of the third dielectric 122 increases, the resonance phenomenon decreases, and the emissivity is lowered as a result.

Contrarily, as is confirmed in FIG. 6C, performance of the selective emitter is maintained if the material of the unit structure, which is metal, is replaced with gold, silver, copper or the like, and as is confirmed in FIG. 6D, the height of the unit metal block itself does not greatly affect the emissivity.

According to the simulation result, it can be confirmed that the parameters having a meaningful effect on the setting of the second range and the third range in the composite structure of the present invention are the diameter of the unit metal block and the height of the third dielectric 123.

That is, the wavelength ranges of the second range and the third range may be adjusted by adjusting the diameter of the metal block, and in addition, emissivity may be lowered at a corresponding wavelength by adjusting the thickness of the third dielectric 123, and a shape and a material appropriate to infrared stealth may be selected by performing such a simulation several times.

Figure 7:
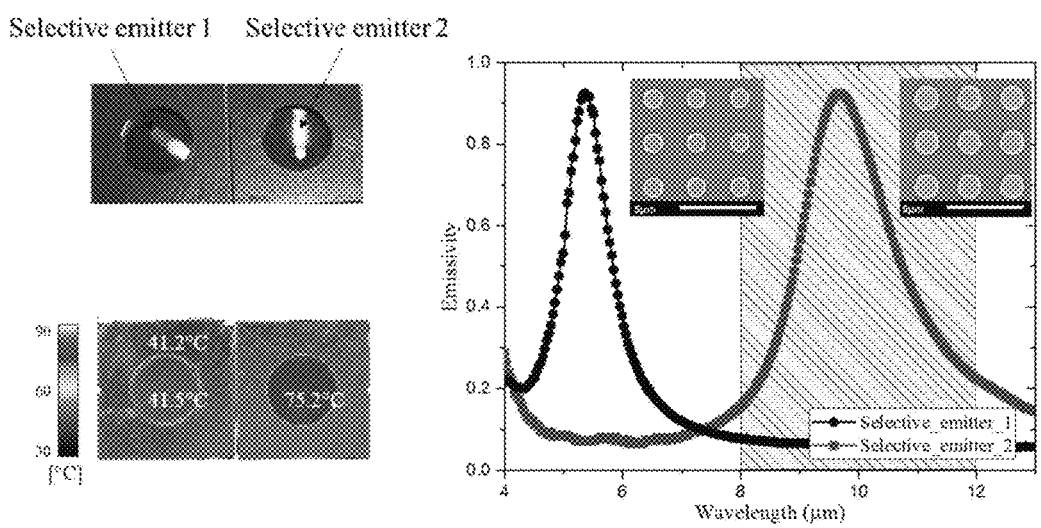
FIG. 7 is a view comparing a selective emitter having an infrared anti-detection performance and a selective emitter not having the infrared anti-detection performance.

FIG. 7 is a view comparing a selective emitter having an infrared anti-detection performance and a selective emitter not having the infrared anti-detection performance.

Here, the selective emitter 1 is a selective emitter having an infrared stealth performance, and the selective emitter 2 is a selective emitter not having an infrared stealth performance.

Specifically, the selective emitter 1 is a stealth surface for blocking infrared waves having a wavelength of an 8 to 12 μm region (corresponding to the main detection region of a radar detector). Referring to the figure on the right side of FIG. 7, it can be confirmed from the emissivity graph of the selective emitter 1 that emissivity of the 8 to 12 μm region is as low as less than 0.2, and infrared waves of a region higher than 4 μm and lower than 8 μm, which is an undetected region, are emitted. The selective emitter 2 is manufactured as a control group of the selective emitter 1, and since it does not have an infrared stealth performance, emissivity in the 8 to 12 μm in region is high.

Referring to the figure on the top left of FIG. 7 again, the two selective emitters are identical so as not to be distinguished with eyes. However, if the two selective emitters are put on a hot plate of 100° C. and photographed using an infrared camera, the selective emitter 1 having a stealth performance shows a temperature the same as the surrounding temperature as shown in the figure on the bottom left of FIG. 7, and the selective emitter 2 shows a temperature higher than the surrounding temperature. In other words, the selective emitter 1 emits very low infrared energy to the surroundings although it is heated by a temperature the same as that of the selective emitter 2. Accordingly, if the selective emitter 1 is applied to a target object, the possibility of detection by an infrared detector can be lowered.

FIG. 8 is a view showing a radar region absorber and a simulation result according to measuring performance of the absorber.

Generally, a criterion for determining whether or not having a stealth performance among the radar stealth performance indexes is having an RCS lower than −10 dB, and a surface emitting radar waves less than one tenth of input radar waves is referred to as a stealth surface.

The figure on the left side of FIG. 8 is a picture of an actually manufactured composite structure 100 for controlling absorptivity and emissivity of radar and infrared regions, and the figure on the right side of FIG. 8 is a graph showing a result of actual measurement and a result of simulating the absorptivity of the manufactured radar absorber. For example, in the composite structure shown in the left side figure of FIG. 8, the area ratio of the unit metal block 123 to the third dielectric 122 is 0.862. Accordingly, a function as a radar selective emitter can be implemented in an area more than 86% of the surface. Seeing the result shown in the right side figure of FIG. 8, it is understood that the radar absorber of the present invention absorbs 90% or more of the radar waves of X-band.

Figure 9:
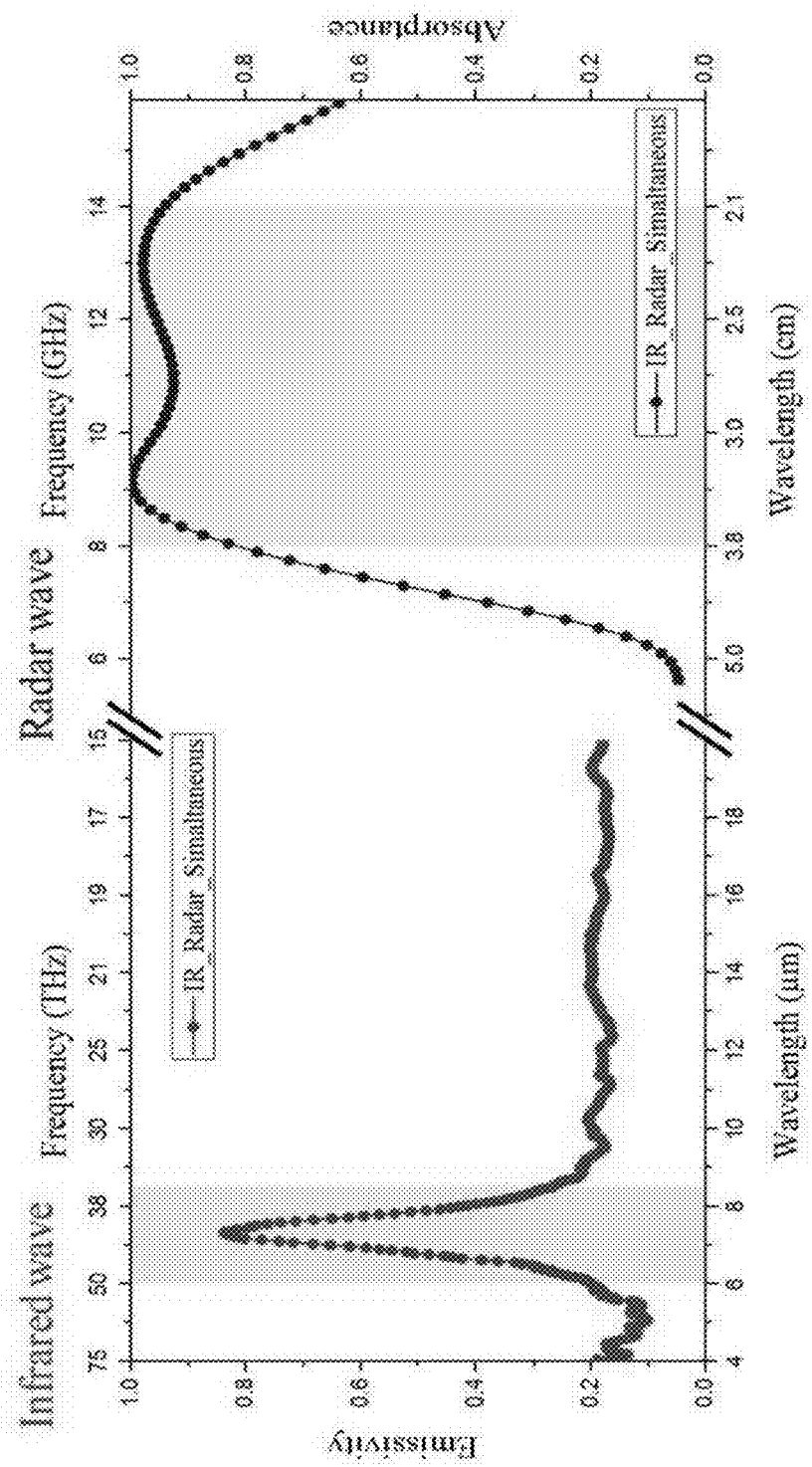
FIG. 9 is a graph showing a result of measuring absorptivity and emissivity of radar and infrared regions according to a wavelength on the surface of a composite structure using a meta-material of the present invention.

FIG. 9 is a graph showing a result of measuring emissivity and absorptivity of radar and infrared regions according a wavelength on the surface of a composite structure using a meta-material of the present invention.

The effect of the composite structure for controlling absorptivity and emissivity of radar and infrared regions of the present invention is emphasized again through FIG. 9, and if the first anti-detection unit 110 is formed as an absorber for absorbing electromagnetic waves of the first range (e.g., having a wavelength of 8 to 14 GHz) and the second anti-detection unit 120 is formed as a selective emitter to block emission of infrared waves of the second range (e.g., having a wavelength of 3 to 5 μm or 8 to 12 μm) from the stealth surface and to emit infrared waves of a region other than the second range, There is an effect of preventing 80% or more of the infrared waves from being emitted and absorbing 90% or more of the radar waves as is confirmed from the result shown in FIG. 9.

According to an embodiment of the present invention, there is provided a composite structure for controlling absorptivity of the radar region and emissivity of the infrared region together. Here, a layer for controlling waves of the radar region (the first anti-detection unit) and a layer for controlling waves of the infrared region (the second anti-detection unit) are respectively configured in a multi-layer structure.

The first anti-detection unit absorbs electromagnetic waves of the radar region passing through the second anti-detection unit to demonstrate an anti-detection performance for waves of the radar region. At this point, the electromagnetic waves of the radar region may mean electromagnetic waves input from the outside of the composite structure for controlling absorptivity and emissivity of the present invention.

The second anti-detection unit is arranged on the first anti-detection unit, and it controls to emit waves of an infrared region having a wavelength of a specific region and block waves of an infrared region having a wavelength other than the specific region and transmits electromagnetic waves of the radar region. Here, the electromagnetic waves of the infrared region may mean electromagnetic waves that can be released from the inside or the surface of the composite structure for controlling absorptivity and emissivity of the present invention. At this point, the electromagnetic waves of the infrared region proceeding toward the outside of the second anti-detection unit may be caused by electromagnetic waves of the radar region previously input inside the composite structure for controlling absorptivity and emissivity of the present invention.

If the invention of the composite structure for controlling absorptivity and emissivity disclosed in the present invention is used, survivability of ally weapon systems against infrared and radar missiles can be improved by overcoming the limit of existing weapon systems having an anti-detection function.

Since a composite anti-detection function for an infrared region and a radar region is approached and demonstrated from the structural aspect, it is easy to verify durability and the like compared with conventional publicized techniques.

This specification is not intended to limit the invention by the presented specific terms. Although the present invention has been described in detail with reference to the embodiments described above, those skilled in the art may make modifications, changes and variations to the embodiments of the present invention without departing from the scope of the invention.

The terms and words used in the specification and the claims should not be interpreted as being limited to ordinary or dictionary meanings, and they should be interpreted as a meaning and concept meeting the technical spirits of the present invention on the principle that an inventor may properly define a concept of a term to describe the invention of the inventor in the most appropriate way.

Therefore, the configurations shown in the embodiments and figures disclosed in this specification are merely the most preferable embodiments of the present invention and do not represent all the technical spirits of the present invention. It should be interpreted such that the meaning and scope of the claims and all the changed and modified forms derived from the equivalents thereof come within the scope of the present invention.

What is claimed is:

1. A composite structure for controlling absorptivity and emissivity, the structure comprising:
   a first anti-detection unit stacked on an anti-detection target object; and
   a second anti-detection unit stacked on the first anti-detection unit,
   wherein the first anti-detection unit is an absorber for absorbing a first wavelength range of electromagnetic waves input from an outside of the first anti-detection unit,
   wherein the second anti-detection unit is a selective emitter for selectively blocking emission of a second wavelength range of electromagnetic waves and selectively allowing emission of a third wavelength range of electromagnetic waves, from among electromagnetic waves that can be emitted to an outside of the second anti-detection unit,
   wherein the first anti-detection unit absorbs a radar wavelength region of electromagnetic waves, and the second anti-detection unit selectively emits an infrared wavelength region of electromagnetic waves,
   wherein the first anti-detection unit has a thickness in millimeters and the second anti-detection unit has a thickness in nanometers so that the radar wavelength region of electromagnetic waves can pass through the second anti-detection unit,
   wherein the first anti-detection unit is formed of a stack of a first base layer, a first dielectric, an electromagnetic wave shield layer, a second dielectric and a first metal layer,
   wherein the first metal layer is made of a plurality of unit metal blocks of a same shape which are arranged on the second dielectric and spaced apart from each other by a distance of each of slits formed between the plurality of unit metal blocks, and
   wherein the radar wavelength region of electromagnetic waves absorbed by the first anti-detection unit is determined according to the distance of each of the slits formed on the first metal layer or a thickness of the first metal layer.

2. The structure according to claim 1, wherein:
   the third wavelength range of electromagnetic waves indicates wavelengths corresponding to a part of a wavelength region of several to tens of micrometers, and
   the second wavelength range of electromagnetic waves indicates wavelengths other than the third wavelength range of electromagnetic waves.

3. The structure according to claim 2, wherein:
   the third wavelength range of electromagnetic waves indicates wavelengths larger than 5 μm and smaller than 8 μm, and
   the second wavelength range of electromagnetic waves wavelengths larger than or equal to 3 μm and smaller than or equal to 5 μm or larger than or equal to 8 μm and smaller than or equal to 12 μm.

4. The structure according to claim 1, wherein the first metal layer has a same configuration as a base layer of the second anti-detection unit, and the base layer of the second anti-detection unit is replaced with the first metal layer.

5. The structure according to claim 1, wherein the second anti-detection unit is formed of a stack of a second base layer, a third dielectric and a second metal layer.

6. The structure according to claim 5, wherein the second metal layer is made of a plurality of unit metal blocks of a same shape which are arranged on the third dielectric.

7. The structure according to claim 6, wherein the plurality of unit metal blocks are spaced apart from each other to form a certain pattern.

8. The structure according to claim 6, wherein:
   a wavelength of the second wavelength range of electromagnetic waves varies according to change of a diameter of the unit metal blocks of the second metal layer, and
   an emission amount of the second wavelength range of electromagnetic waves varies according to change of thickness of the third dielectric.

* * * * *